(12) United States Patent
Iida

(10) Patent No.: US 7,537,544 B2
(45) Date of Patent: May 26, 2009

(54) CONTROL DEVICE FOR VEHICLE

(75) Inventor: Hiroaki Iida, Hashima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 156 days.

(21) Appl. No.: 11/435,853

(22) Filed: May 18, 2006

(65) Prior Publication Data

US 2006/0281601 A1    Dec. 14, 2006

(30) Foreign Application Priority Data

Jun. 14, 2005    (JP)    ............................. 2005-173677

(51) Int. Cl.
*B60W 10/06*    (2006.01)
*B60W 10/10*    (2006.01)
(52) U.S. Cl. .................................................. 477/108
(58) Field of Classification Search ................. 477/108
See application file for complete search history.

(56) References Cited

U.S. PATENT DOCUMENTS 5,609,546 A * 3/1997 Torii et al. .................. 477/108

FOREIGN PATENT DOCUMENTS

JP    11-78599    3/1999

* cited by examiner

*Primary Examiner*—Roger L Pang
*Assistant Examiner*—Derek D Knight
(74) *Attorney, Agent, or Firm*—Oblon, Spivak, McClelland, Maier & Neustadt, P.C.

(57) ABSTRACT

A cruise control device executes a program including the steps of: when shift information transmitted from an ECT-ECU changes from fifth gear to fourth gear, and the time T (1) from a change in the shift information has elapsed, determining that down shifting to fourth gear has been conducted, effecting upshift inhibit control, and effecting throttle return control at elapse of the time T (2) from a change in the shift information transmitted from the ECT-ECU.

8 Claims, 5 Drawing Sheets

CONTROL DEVICE FOR VEHICLE

This nonprovisional application is based on Japanese Patent Application No. 2005-173677 filed with the Japan Patent Office on Jun. 14, 2005, the entire contents of which are hereby incorporated by reference.

BACKGROUND OF THE INVENTION

1. Field of the Invention

The present invention relates to a control device for a vehicle, particularly to the control of suppressing occurrence of an impact caused by gear shifting while preventing the event of frequent shifting in the automatic transmission during a constant speed cruising mode of the vehicle.

2. Description of the Background Art

Conventionally in a constant speed cruising mode of a vehicle, the event of frequent shifting may occur due to change in the inclination of the road such as in the case of running on a slope. This frequent shifting refers to the operation of the gear of the automatic transmission repeating an upshift and downshift. In view of the foregoing, Japanese Patent Laying-Open No. 11-078599, for example, discloses a constant speed cruising apparatus that prevents frequent shifting repeatedly between an overdrive (OD) gear and third gear of the automatic transmission. This constant speed cruising apparatus includes an automatic transmission switching a plurality of gears to transmit the power of the internal combustion engine to the wheels, transmission control means, throttle driving means responding to a throttle opening control signal having the duty representing the throttle opening for driving the throttle valve so as to attain the throttle opening represented by the throttle opening control signal, and constant speed cruising control means. The transmission control means shifts the gear of the automatic transmission according to a vehicle speed pattern corresponding to the throttle opening, and derives a transmission signal representing a downshift when down shifting from the overdrive gear to a gear of higher reduction gear ratio. When an overdrive cut request signal is received, upshift return to the overdrive gear is not effected. When an upshift return signal is received, upshifting to the overdrive gear is effected. The constant speed cruising control means provides a throttle opening control signal to the throttle driving means such that the speed of the vehicle corresponds to the set speed, and responds to a transmission signal to derive and provide to the transmission control means an overdrive cut request signal. The constant speed cruising control means further includes throttle opening output means for obtaining the throttle opening, and setting means for setting an opening set value ci for upshift return that is substantially equal to a predetermined throttle opening in a constant speed cruising mode on a flat road. When the throttle opening obtained by the throttle opening output means moves in the closing direction for at least the upshift return opening set value ci, the overdrive cut request signal is canceled and the generated upshift return signal is provided to the transmission control means.

In accordance with the constant running apparatus disclosed in the aforementioned publication, the throttle opening during a constant speed cruising mode in third gear will not operate in a closing direction for more than the set value ci, i.e. the throttle opening will take a large value exceeding ci, when climbing a long upward slope. Therefore, the overdrive cut request signal will not be canceled. Accordingly, the possibility of upshifting from third gear to overdrive gear is suppressed, preventing frequent shifting.

However, when the vehicle speed is low during downshifting in a constant speed cruising control mode, a request is made to increase the throttle opening in order to attain the preset speed. Thus, there is a problem that an impact occurs at the vehicle caused by the increase in the request of the throttle opening when down shifting is completed.

Since the engine output is not transmitted to the driving wheel during down shifting in a constant speed cruise control mode, the speed of the vehicle will become lower. At this stage, the request value of the throttle opening is increased in order to maintain the preset speed. Therefore, control is effected so as to increase the throttle opening. This entails the problem of occurrence of an impact at the vehicle caused by an abrupt acceleration of the vehicle when down shifting is completed at the transmission and the output of the engine is transmitted to the driving wheel.

The constant speed cruising apparatus disclosed in the aforementioned publication may encounter the problem set forth above since increase in the requested amount of throttle opening during down shifting is not taken into account.

SUMMARY OF THE INVENTION

An object of the present invention is to provide a control device for a vehicle directed to suppressing frequent shifting and also suppressing an impact occurring at the vehicle subsequent to completion of transmission.

A control device for a vehicle according to an aspect of the present invention corresponds to a control device for a vehicle having an internal combustion engine and an automatic transmission including a plurality of gears mounted. The automatic transmission is provided with a transmission control device determining the gear of the automatic transmission to control the automatic transmission so as to achieve the determined gear based on the output state of the internal combustion engine and the running state of the vehicle. The transmission control device outputs shift information representing the determined gear to the control device. The control device includes a sensing unit sensing the speed of the vehicle, a determination unit determining the output of the internal combustion engine such that the sensed speed attains a preset speed, a control unit controlling the output of the internal combustion engine based on the determined output, a shift information sensing unit sensing a change in shift information when the transmission control device controls the automatic transmission such that the gear of the automatic transmission is down shifted, a restriction unit restricting an upshift of the gear based on the changed shift information at elapse of a predetermined first time from sensing the change under a state of the vehicle speed being preset, and a reduction unit reducing the output of the internal combustion engine at elapse of a second time longer than the first time from sensing the change.

When the shift information changes (for example, when the gear is downshifted) under a state of the speed of the vehicle being preset in the present invention, the restriction unit restricts an upshift of the gear based on the sensed shift information at elapse of the first time from a change in the shift information. Accordingly, even though the speed and the degree of the output request of the internal combustion engine changes so that an upshift is requested, upshifting will not be effected. Therefore, frequent shifting corresponding to repetition of an upshift and downshift can be suppressed. By setting the first time shorter within the range of time that allows shift information to be sensed impervious to noise and the like, the upshift can be restricted at an early stage. The reduction unit reduces the output of the internal combustion engine at elapse of the second time that is longer than the first time from the change in shift information. For example, when the second time corresponds to the time starting from a change in shift information and completion of transmission control until the output of the internal combustion engine is transmitted to the driving wheel of the vehicle, reduction of the output of the internal combustion engine at the elapse of the second time allows suppression of an impact that will occur due to high power of the internal combustion engine subsequent to completion of transmission. Thus, there can be provided a control device for a vehicle directed to suppressing frequent shifting and also suppressing an impact occurring at the vehicle subsequent to completion of transmission. The automatic transmission including a plurality of gears may be a stepped type automatic transmission, or an infinitely variable automatic transmission. The infinitely variable automatic transmission has a plurality of discrete transmission ratios, and likewise a step type automatic transmission, modifies the gear ratio in a stepped or continuous manner based on the speed and the degree of the output request.

Preferably, the second time is a period of time starting from sensing a change in the shift information until the output of the internal combustion engine is transmitted to the driving wheel of the vehicle.

Therefore, by reducing the output of the internal combustion engine at elapse of the second time, the occurrence of an impact caused by the large output of the internal combustion engine subsequent to completion of transmission can be suppressed.

Further preferably, the control unit controls the output of the internal combustion engine by controlling the opening of the throttle valve provided at the internal combustion engine.

Accordingly, by effecting control such that the opening of the throttle valve is moved towards closing at the elapse of the time starting from down shifting until the output of the internal combustion engine is transmitted to the driving wheel, the occurrence of an impact caused by the large output of the internal combustion engine subsequent to completion of transmission can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
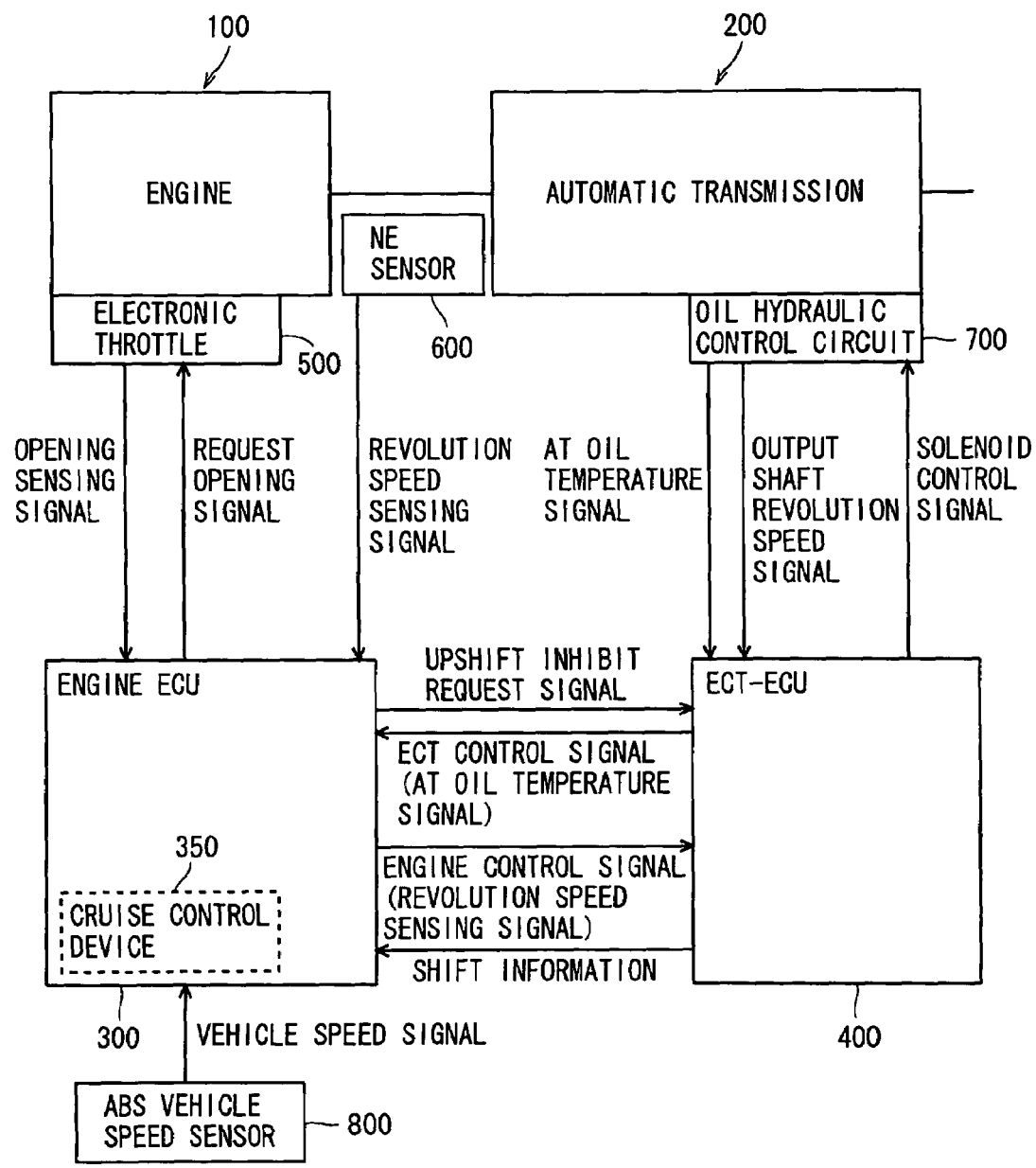
FIG. 1 shows a configuration of a power train in which a control device for a vehicle according to a first embodiment is incorporated.

Embodiments of the present invention will be described hereinafter with reference to the drawings. The same elements have the same reference characters allotted. Their designation and function are also identical. Therefore, detailed description thereof will not be repeated.

First Embodiment

A power train of a vehicle under control of a control device according to the present embodiment will be described hereinafter. Referring to FIG. 1, the power train of the vehicle includes an engine 100, an automatic transmission 200, an engine ECU (Electronic Control Unit) 300, and an ECT (Electronic Controlled Automatic Transmission)-ECU 400.

Engine 100 is provided with an electronic throttle 500. Electronic throttle 500 controls the opening of a throttle valve (not shown) based on a control signal received from engine ECU 300. Electronic throttle 500 is provided with a throttle position sensor (not shown). The throttle position sensor transmits an opening sensing signal indicating the sensed opening of the throttle valve to engine ECU 300.

An NE sensor 600 is provided at the output shaft of engine 100. NE sensor 600 transmits to engine ECU 300 a revolution speed sensing signal indicating the output shaft revolution speed of engine 100 (engine speed NE).

The output shaft of engine 100 is coupled to the input shaft of automatic transmission 200. Automatic transmission 200 is a 5-speed stepped type automatic transmission having a gear type transmission mechanism with a torque converter as a fluid coupling. The present invention is not limited to a 5-speed automatic transmission. Further, automatic transmission 200 is not limited to a stepped type automatic transmission having a plurality of gears, and may be a continuously variable automatic transmission including a plurality of discrete gear ratios for modifying the gear ratio in a stepped or continuous manner.

Automatic transmission 200 has a clutch element and brake element identified as a plurality of friction elements provided inside. Automatic transmission 200 is provided with an oil hydraulic control circuit 700 controlling the engagement and release of the clutch element or brake element using a solenoid valve and the like. Oil hydraulic control circuit 700 controls the solenoid valve based on a solenoid control signal received from ECT-ECU 400 and a predetermined operation table such that the clutch element, brake element, and one way clutch element identified as friction elements are engaged or released corresponding to each required speed gear.

The drive force from the output shaft of automatic transmission 200 is transmitted to the driving wheel (not shown). An ABS (Antilock Braking System) vehicle speed sensor 800 is provided at the driving wheel. ABS vehicle speed sensor 800 transmits a vehicle speed signal indicating the revolution speed of the driving wheel to engine ECU 300.

ECT-ECU 400 receives an output shaft revolution speed signal indicating the output shaft revolution speed sensed by an output shaft revolution speed sensor (not shown) provided at automatic transmission 200, and also an AT oil temperature signal indicating the oil temperature of the hydraulic fluid in automatic transmission 200 therefrom.

NE sensor 600, the output shaft revolution speed sensor, or ABS vehicle speed sensor 800 are provided facing the output shaft of engine 100, the output shaft of automatic transmission 200 or the teeth of the rotation detection gear attached to the driving wheel, respectively. These sensors are capable of detecting any slight rotation of the rotational shaft, and are sensors employing reluctance elements generally referred to as semiconductor type sensors. These sensors can also be implemented by the conventional type of revolution speed sensors.

ECT-ECU 400 receives an upshift inhibit request signal and an engine control signal from engine ECU 300. ECT-ECU 400 restricts the upshift of the speed gear when an upshift inhibit request signal is received from engine ECU 300. For example, ECT-ECU 400 restricts the upshift to fifth gear when an upshift inhibit request signal to fifth gear is received. Upon receiving an engine control signal from engine ECU 300, ECT-ECU 400 controls oil hydraulic control circuit 700 based on the received engine control signal. As used herein, the engine control signal represents the control state of engine 100. For example, the engine control signal includes a revolution speed signal sensed by an NE sensor as well as an opening sensing signal input into engine ECU 300 from electronic throttle 500.

Further, ECT-ECU 400 transmits an ECT control signal (for example AT oil temperature signal) and shift information to engine ECU 300. As used herein, "ECT control signal" represents the control state of automatic transmission 200 and oil hydraulic control circuit 700, and includes, for example, an AT oil temperature signal. Engine ECU 300 controls engine 100 based on such ECT control signals and other control signals. ECT-ECU 400 determines the shift position taking into account the engine control signal received from engine ECU 300 to output shift information that represents the shift position (speed gear) determined to engine ECU 300.

ECT-ECU 400 also takes into account the engine control signal received from engine ECU 300 to transmit a solenoid control signal to oil hydraulic control circuit 700. Based on this solenoid control signal, various solenoid valves such as the linear solenoid valve and on/off solenoid valve of oil hydraulic control unit 700 are controlled. Control is effected such that the friction engagement elements are engaged and released so as to form a predetermined speed gear (first gear to fifth gear).

A cruise control device 350 is provided at engine ECU 300. Cruise control device 350 controls the transmission operation of automatic transmission 200 via the output of engine 100 and ECT-ECU 400 such that the speed of the vehicle preset by the driver is maintained. Specifically, cruise control device 350 determines the throttle requested opening according to a change in the vehicle speed. Also, an upshift inhibit request signal directed to preventing frequent shifting is output.

When the speed is lower than the preset speed, cruise control device 350 controls the vehicle such that the preset speed is achieved by increasing the opening of the throttle valve according to the requested amount of opening the sensed throttle valve, and/or increasing the opening of the throttle valve to down shift the gear of the automatic transmission 200, whereby the driving force of the vehicle is increased. The control device for a vehicle according to the present embodiment is realized by a program executed by cruise control device 350.

According to the configuration of the power train of the vehicle set forth above, cruise control device 350 identified as the control device for a vehicle of the present embodiment modifies the throttle requested opening according to the sensed speed and set speed, and ECT-ECU 400 executes downshift control based on a shift map. The shift information is sequentially transmitted by ECT-ECU 400 towards engine ECU 300. When the shift information transmitted from ECT-ECU 400 changes (for example, when down shifting) under a state of the vehicle speed being preset, cruise control device 350 restricts the upshift of the speed gear at elapse of a predetermined time T(1) from the change in shift information. At elapse of a time T(2) longer than time T(1) from the change of the shift information from fifth gear to fourth gear, transmitted from ECT-ECU 400, cruise control device 350 reduces the output of engine 200. The present embodiment is characterized in that cruise control device 350 operates as set forth above.

The control configuration of a program executed by cruise control device 350 identified as the control device for a vehicle of the present embodiment will be described hereinafter with reference to FIG. 2.

At step (hereinafter, "step" indicated as S) 100, cruise control device 350 confirms whether the shift information transmitted from ECT-ECU 400 has changed from fifth gear to fourth gear. When the shift information indicating a change from fifth gear to fourth gear is received from ECT-ECU 400 (YES at S100), control proceeds to S102, otherwise (NO at S100), control returns to S100.

At S102, cruise control device 350 determines whether time T(1) has elapsed from the change in the shift information from fifth gear to fourth gear. Time T(1) is predetermined within the range of time that allows determination of the speed gear subsequent to down shifting, absent of surge noise caused by the drive of the solenoid valve or radiation noise to the communication line in the shift information transmitted from ECT-ECU 400. Time T(1) is preferably as short as possible. At elapse of time T(1) from the change of the shift information from fifth gear to fourth gear (YES at S102), control proceeds to S104, otherwise (NO at S102), control returns to S102.

At S104, cruise control device 350 determines that down shifting to fourth gear has been made based on the shift information received from ECT-ECU 400. At S106, cruise control device 350 effects upshift inhibit control. Specifically, cruise control device 350 turns on an upshift inhibit flag towards fifth gear, and transmits an upshift inhibit request signal indicating that upshift to fifth gear is inhibited to ECT-ECU 400.

At S108, cruise control device 350 determines whether time T(2) has elapsed from the change in shift information from fifth gear to fourth gear. Time T(2) is longer than time T(1), and is a predetermined time until completion of transmission control, following a change in the shift information from fifth gear to fourth gear. At elapse of time T(2) (YES at S108) from a change in the shift information from fifth gear to fourth gear, control proceeds to S110, otherwise (NO at S108), control returns to S108.

At S110, cruise control device 350 effects throttle return control. Specifically, cruise control device 350 forcefully reduces the requested amount of opening the throttle valve. Cruise control device 350 may reduce the requested amount of opening the throttle valve to substantially zero, or to a predetermined requested amount. Alternatively, cruise control device 350 may reduce the amount to a level corresponding to a value of the immediately preceding throttle valve opening multiplied by a constant ratio. The throttle valve of electronic throttle 500 is controlled so as to move towards the closing state by the reduction in the requested amount.

Figure 3:
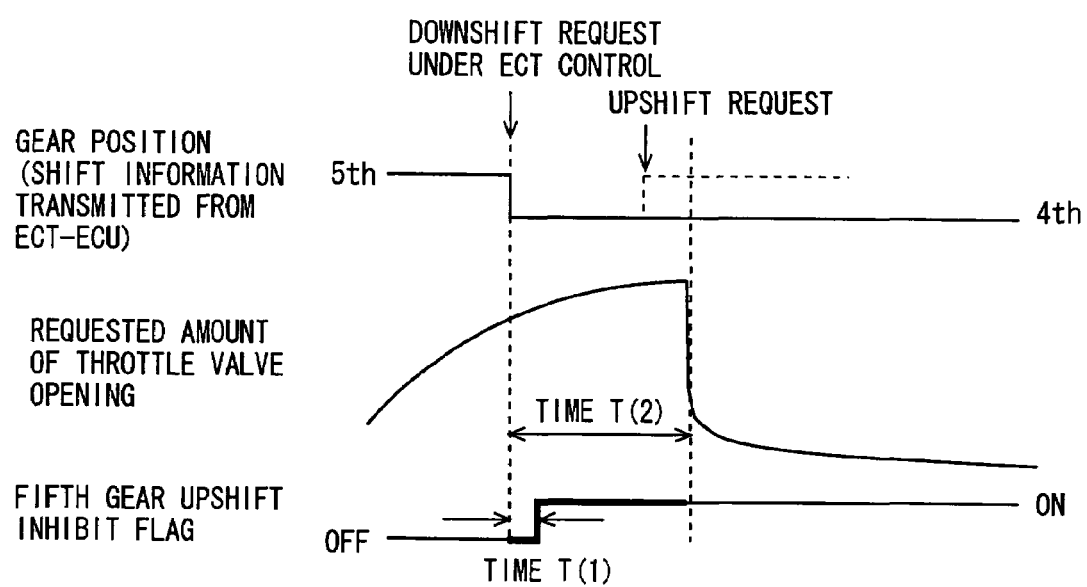
FIG. 3 is a timing chart of the operation of the cruise control device qualified as the control device for a vehicle according to the first embodiment.

An operation of cruise control device 350 based on the configuration and flow chart set forth above will be described with reference to FIG. 3.

When the position of the speed gear of automatic transmission 200 is in fifth gear, and the vehicle is running so as to maintain the speed preset by the driver, the speed will be lowered when the vehicle comes to run on a road that is abrupt in inclination such as a slope. In order to maintain the speed, cruise control device 350 requests the throttle valve to be opened. As a result, the downshift line in the shift map stored in ECT-ECU 400 may be passed over. In this case, ECT-ECU 400 implements the downshift control (from fifth gear to fourth gear) (downshift request under ECT control), and the shift information transmitted to engine ECU 300 is updated (YES at At elapse of time T(1) from a change in the shift information from fifth gear to fourth gear (YES at S102), cruise control device 350 determines that down shifting to fourth gear has been conducted based on the received shift information (S104). Then, the upshift inhibit flag to fifth gear is turned on, and an upshift inhibit request signal is transmitted to ECT-ECU 400 (S106).

At elapse of time T(2) from a change in the shift information from fifth gear to fourth gear (YES at S108), throttle return control is effected (S110), and the requested amount of throttle valve opening is reduced. Since increase in the output of engine 100 is suppressed, occurrence of an impact caused by abrupt acceleration of the vehicle when the output of engine 100 is transmitted to the driving wheel subsequent to completion of transmission control to fourth gear can be suppressed. Even if an upshift request towards fifth gear is issued (broken line) after the upshift inhibit flag towards fifth gear is turned on and before transmission to fourth gear has been completed, the upshift to fifth gear is restricted.

By virtue of the control device for a vehicle of the present embodiment, an upshift of the speed gear is restricted based on the shift information at elapse of time T(1) from the change in the shift information from fifth gear to fourth gear when downshifting during a vehicle constant speed cruising mode. Therefore, even if an upshift is requested corresponding to a change in the speed and the throttle valve opening at the engine, the upshift is restricted. Thus, frequent shifting of repeating an upshift and downshift can be suppressed. Particularly by setting time T(1) as short as possible, within the range of time allowing sensing of the shift information without being effected by noise and the like, an upshift can be restricted at an early stage. Since an upshift can be restricted reliably even if an upshift is requested immediately after a downshift is requested under ECT control, frequent shifting can be suppressed.

By reducing the requested amount of throttle valve opening in the engine at elapse of time T(2) that is shorter than time T(1) from a change in the shift information, control is effected such that the opening of the throttle valve is moved towards the closing state to reduce engine output. Particularly by setting time T(2) to the time starting from a change in shift information from fifth gear to fourth gear until transmission of the engine output to the vehicle driving wheel, occurrence of an impact caused by a large requested amount of throttle valve opening subsequent to completion of transmission can be suppressed. Therefore, a control device for a vehicle directed to suppressing frequent shifting and also suppressing an impact occurring at the vehicle subsequent to completion of transmission can be provided. Although the present embodiment was described based on down shifting from fifth gear to fourth gear, the present invention is not limited to down shifting from fifth gear to fourth gear. The present invention is also applicable to down shifting from fourth gear to third gear.

Second Embodiment

A control device for a vehicle according to a second embodiment of the present invention will be described hereinafter. The configuration of the power train of a vehicle under control of the control device for a vehicle of the present embodiment is similar to that of the power train of a vehicle under control of the control device for a vehicle according to the first embodiment described with reference to FIG. 1. Corresponding elements have the same reference characters allotted, and their functions are also similar. Therefore, detailed description thereof will not be repeated.

Cruise control device 350 qualified as the control device for a vehicle of the second embodiment requests opening/closing of the throttle valve to maintain the speed. The downshift line in the shift map stored in ECT-ECU 400 may be passed over, in which case ECT-ECU 400 implements downshift control (fifth gear to fourth gear), and the shift information transmitted to engine ECU 300 is updated. Under a state of the vehicle speed being preset, cruise control device 350 restricts an upshift of the speed gear at elapse of a predetermined time T(1) from a change in the shift information from fifth gear to fourth gear. At elapse of time T(2) longer than time T(1) from a change in the shift information transmitted from ECT-ECU 400, cruise control device 350 reduces the output of engine 200. The present embodiment is characterized in that cruise control device 350 operates as set forth above. Further, the present embodiment is characterized in that reliably suppressing frequent shifting and suppressing occurrence of an impact at the vehicle subsequent to completion of transmission can both be realized even when a request to modify the gear is issued continuously.

Figure 4:
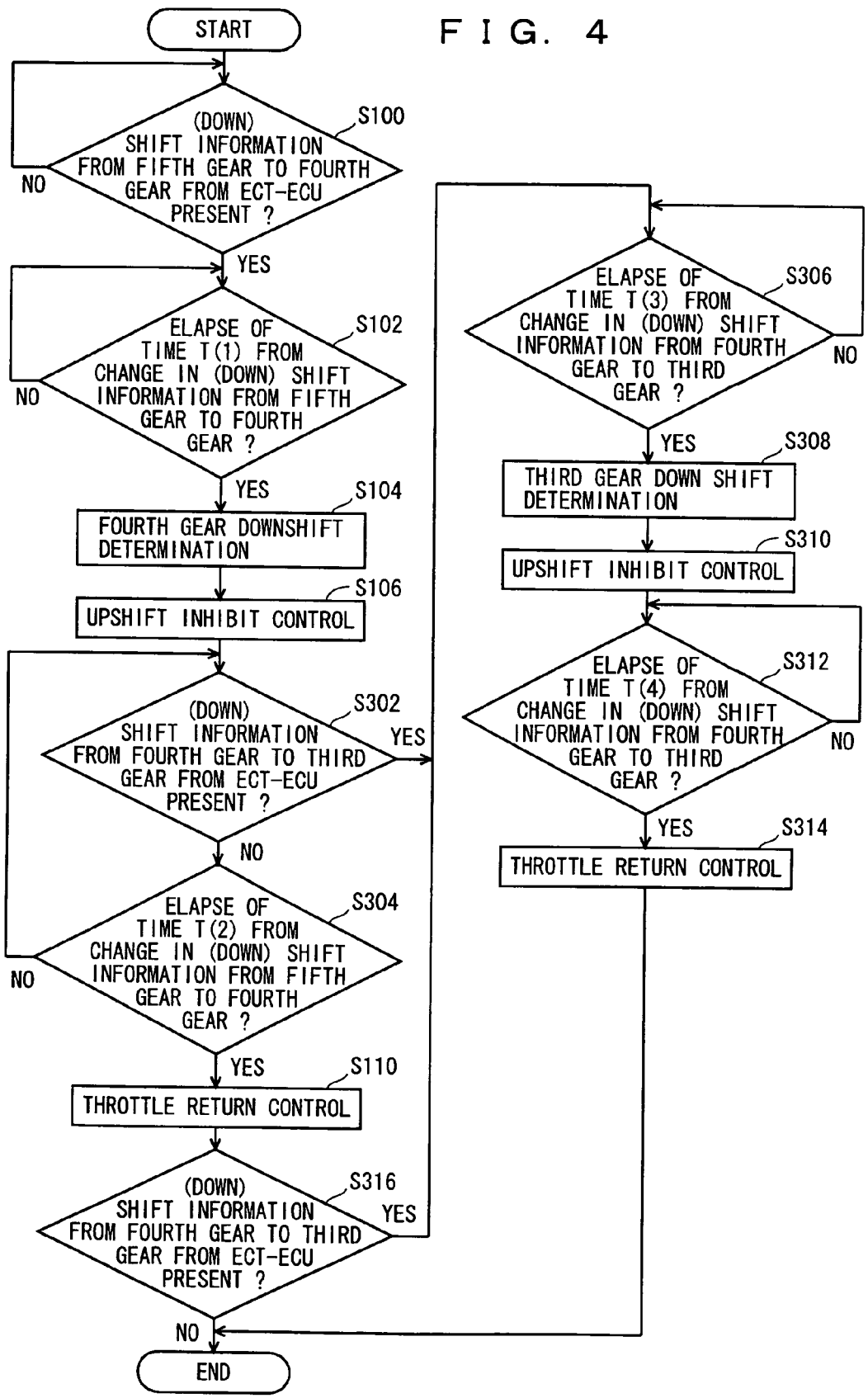
FIG. 4 is a flow chart representing a control configuration of a program executed by a cruise control device qualified as the control device for a vehicle according to a second embodiment.

Referring to FIG. 4, a control configuration of a program executed by cruise control device 350 qualified as the control device for a vehicle of the present embodiment will be described hereinafter.

Figure 2:
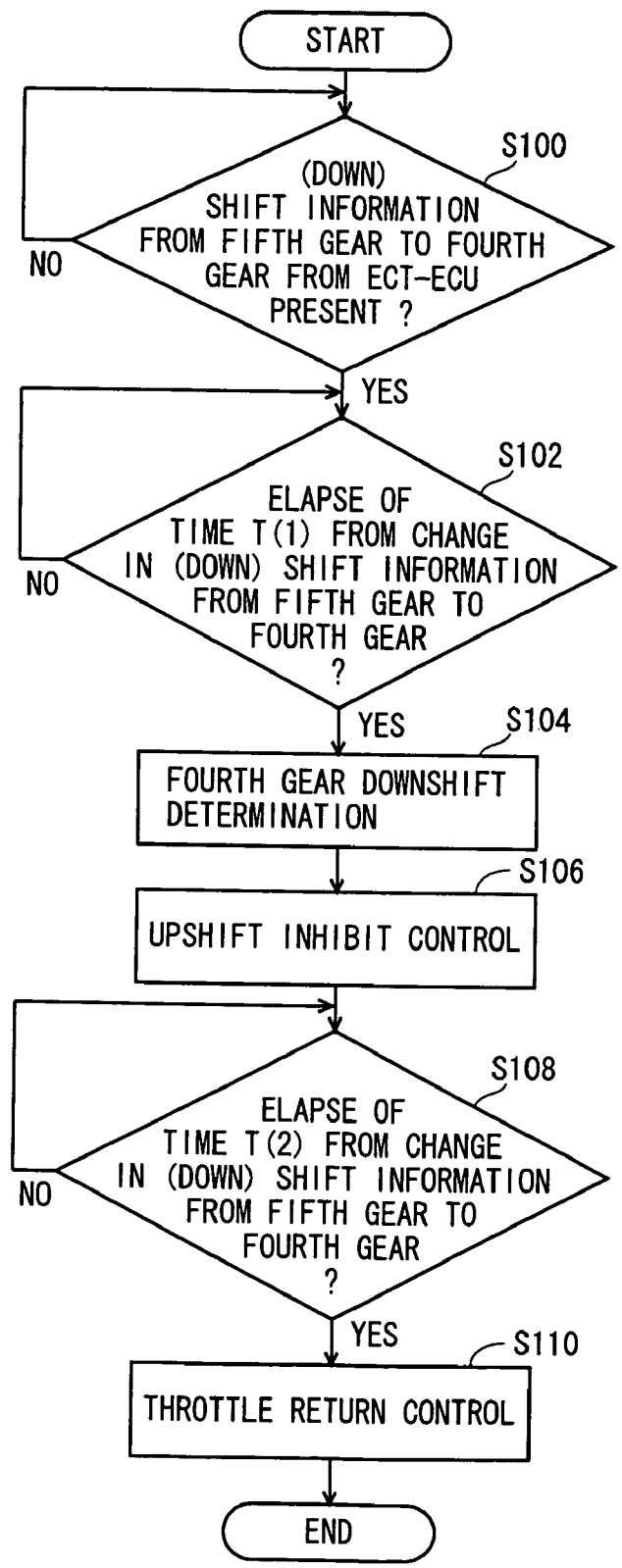
FIG. 2 is a flow chart representing the control configuration of a program executed by a cruise control device qualified as the control device for a vehicle according to the first embodiment.

In the flow chart of FIG. 4, any step identical to that in the flow chart of FIG. 2 has the same step number allotted. The procedure thereof is identical. Therefore, detailed description thereof will not be repeated.

At S302, cruise control device 350 determines whether the shift information transmitted from ECT-ECU 400 has changed from fourth gear to third gear. When the shift information has changed from fourth gear to third gear (YES at S302), control proceeds to S306, otherwise (NO at S302), control proceeds to S304.

At S304, cruise control device 350 determines whether time T(2) has elapsed from a change in the shift information from fifth gear to fourth gear. Time T(2) is longer than time T(1), and corresponds to a predetermined time starting from a change in the shift information from fifth gear to fourth gear until completion of transmission control. At elapse of time T(2) starting from a change in the shift information from fifth gear to fourth gear (YES at S304), control proceeds to S110, otherwise (NO at S304), control returns to S302.

At S306, cruise control device 350 determines whether a time T(3) has elapsed or not from a change in the shift information from fourth gear to third gear. Time T(3) is a predetermined time within the range of time that allows determination of the speed gear subsequent to down shifting, absent of surge noise caused by the drive of a solenoid valve or radiation noise to the communication line in the shift information transmitted from ECT-ECU 400. Preferably, time T(3) is set as short as possible. Time T(3) may have the same duration as time T(1). At elapse of time T(3) from the change in the shift information from fourth gear to third gear (YES at S306), control proceeds to S308, otherwise (NO at S306), control returns to S306.

At S308, cruise control device 350 determines that down shifting has been conducted to third gear based on the shift information from ECT-ECU 400. At S310, cruise control device 350 effects upshift inhibit control. Specifically, cruise control device 350 turns on the upshift inhibit flag towards fourth gear, and transmits an upshift inhibit request signal indicating inhibition of an upshift to fourth gear to ECT-ECU 400.

At S312, cruise control device 350 determines whether a time T(4) has elapsed from a change in the shift information from fourth gear to third gear. Time T(4) is longer than time T(3), and is predetermined starting from a change in the shift information from fourth gear to third gear until transmission is completed. Time T(4) may have the same duration as time T(2). At elapse of time T(4) from the change in shift information from fourth gear to third gear (YES at S312), control proceeds to S314, otherwise (NO at S312), control returns to S312.

At S314, cruise control device 350 effects throttle return control. Specifically, cruise control device 350 forcefully reduces the requested amount of throttle valve opening according to the preset speed. Cruise control device 350 may reduce the requested amount of opening the throttle valve to substantially zero, or to a predetermined requested amount. Alternatively, cruise control device 350 may reduce the amount to a level corresponding to a value of the immediately preceding throttle valve opening multiplied by a constant ratio. The throttle valve of electronic throttle 500 is controlled so as to move towards the closing state by the reduction in the requested amount.

At S316, cruise control device 350 determines whether (down) shift information from fourth gear to third gear has been received from ECT-ECU 400. When cruise control device 350 receives (down) shift information from fourth gear to third gear from ECT-ECU 400 (YES at S316), control proceeds to S306, otherwise (NO at S316), the process ends.

An operation of cruise control device 350 identified as the control device for a vehicle according to the present embodiment, based on the configuration and flow chart set forth above, will be described hereinafter with reference to FIGS. 5 and 6.

Figure 5:
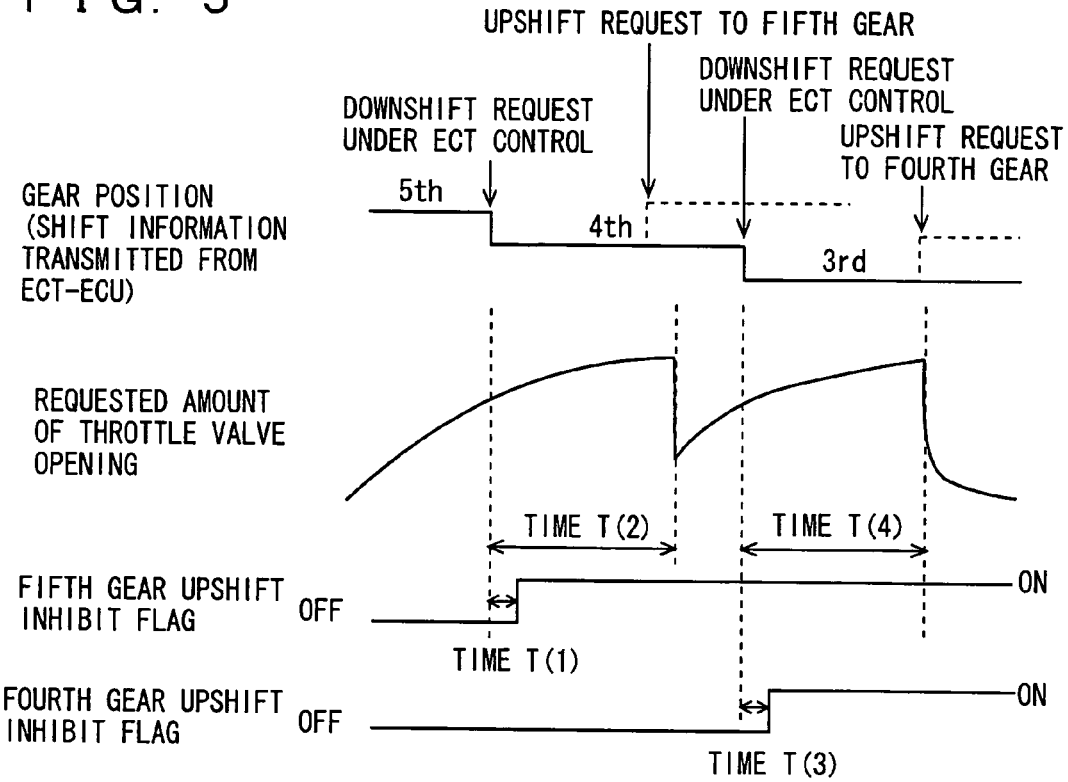
FIGS. 5 and 6 are first and second timing charts, respectively, of an operation of the cruise control device qualified as the control device for a vehicle according to the second embodiment.

Referring to FIG. 5, when the position of the speed gear at automatic transmission 200 is fifth gear, and the vehicle is running so as to maintain the speed preset by the driver, the speed is lowered when the vehicle comes to a road that is abrupt in inclination such as a slope. Cruise control device 350 requests opening of the throttle to maintain the speed. As a result, the downshift line in the shift map stored in ECT-ECU 400 may be passed over, in which case ECT-ECU 400 implements downshift control (from fifth gear to fourth gear) (downshift request under ECT control), and the shift information transmitted to engine ECU 300 is updated (YES at S100).

At elapse of time T(1) from a change in the shift information from fifth gear to fourth gear (YES at S102), cruise control device 350 determines that down shifting to fourth gear has been conducted based on the received shift information (S104). Then, an upshift inhibit flag to fifth gear is turned on, and an upshift inhibit request signal is transmitted to ECT-ECU 400 (S106).

When down shifting from fourth gear to third gear is not effected (NO at S302), and time T(2) from a change in the shift information from fifth gear to fourth gear has elapsed (YES at S304), throttle return control is effected (S110), whereby the requested amount of throttle valve opening is reduced. Since increase in the output of engine 200 is suppressed, occurrence of an impact caused by an abrupt acceleration of the vehicle when the output of engine 100 is transmitted to the driving wheel subsequent to completion of transmission control to fourth gear can be suppressed. An upshift to fifth gear is restricted even in the case where an upshift towards fifth gear (broken line) is requested after the upshift inhibit flag to fifth gear is turned on.

In order to maintain the speed, cruise control device 350 requests opening/closing of the throttle valve. As a result, the downshift line from fourth gear to third gear in the shift map stored in ECT-ECU 400 may be passed over, in which case ECT-ECU 400 implements downshift control (from fourth gear to third gear) (downshift request under ECT control), and the shift information transmitted to engine ECU 300 is updated (YES at S316).

When down shifting from fourth gear to third gear, ECT-ECU 400 controls various solenoid valves of oil hydraulic control circuit 700. According to the control of various solenoid valves, transmission control to third gear is effected by the engagement and release of the brake element or clutch element.

At elapse of time T(3) from the change in the shift information from fourth gear to third gear (YES at S306), cruise control device 350 determines that down shifting to third gear has been conducted based on the received shift information (S308). Then, an upshift inhibit flag to fourth gear is turned on, and an upshift inhibit request signal is transmitted to ECT-ECU 400 (S310).

At elapse of time T(4) from a change in the shift information from fourth gear to third gear (YES at S312), throttle return control is effected (S314), whereby the requested amount of throttle valve opening is reduced. Since increase of the output in engine 200 is suppressed, occurrence of an impact caused by abrupt acceleration of the vehicle when the output of engine 200 is transmitted to the driving wheel subsequent to completion of transmission control to third gear can be suppressed. Even if an upshift to fourth gear is requested (broken line) after the upshift inhibit flag to fourth gear is turned on, the upshift to fourth gear is restricted.

Figure 6:
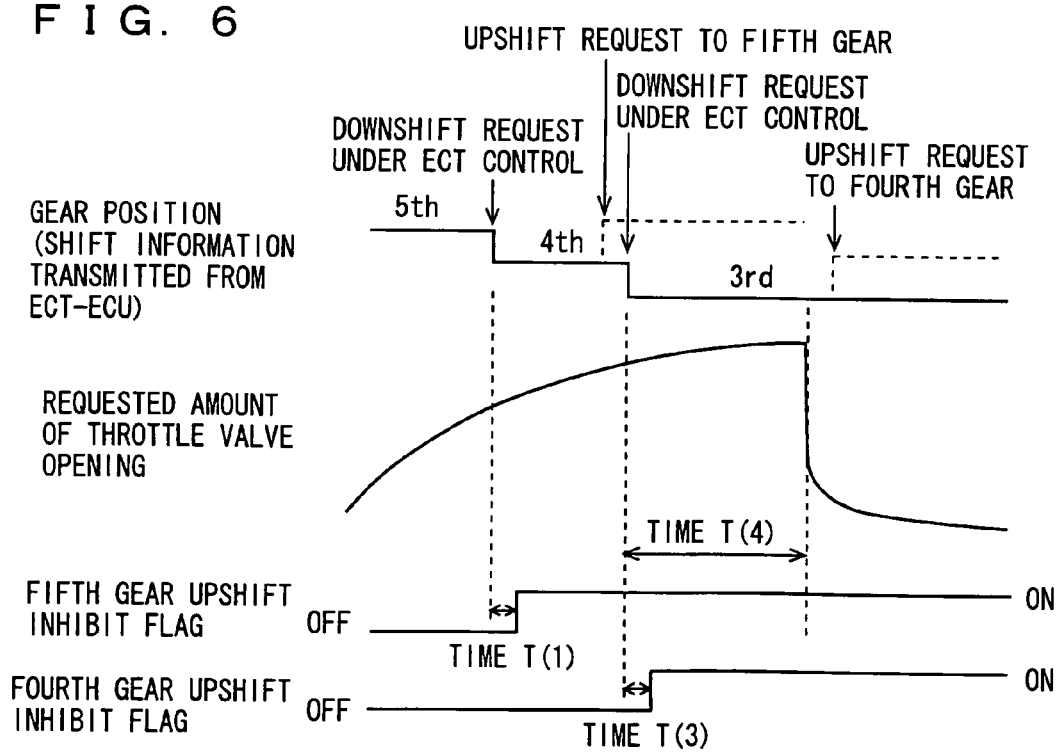

Referring to FIG. 6, when the position of the speed gear of automatic transmission 200 is in fifth gear, and the vehicle is running so as to maintain the speed preset by the driver, the speed will be lowered when the vehicle comes to run on a road that is abrupt in inclination such as a slope. In order to maintain the speed, cruise control device 350 requests the throttle valve to be opened. As a result, the downshift line from fifth gear to fourth gear in the shift map stored in ECT-ECU 400 may be passed over. In this case, ECT-ECU 400 implements the downshift control (from fifth gear to fourth gear) (downshift request under ECT control), and the shift information transmitted to engine ECU 300 is updated (YES at S100).

When down shifting from fifth gear to fourth gear, ECT-ECU 400 controls various solenoid valves of oil hydraulic control circuit 700. In accordance with the control of various solenoid valves, transmission control to fourth gear is effected by the engagement and release of the brake element or clutch element.

At elapse of time T(1) from the change in shift information from fifth gear to fourth gear (YES at S102), cruise control device 350 determines that down shifting has been conducted to fourth gear based on the received shift information (S104). Then, an upshift inhibit flag to fifth gear is turned on, and an upshift inhibit request signal is transmitted to ECT-ECU 400 (S106). Even if an upshift to fifth gear is requested (broken line) after the upshift inhibit flag towards fifth gear is turned on, the upshift to fifth gear is restricted.

At this stage, cruise control device 350 requests opening/closing of the throttle valve in order to maintain the speed. As a result, the downshift line from fourth gear to third gear in the shift map stored in ECT-ECU 400 may be passed over, in which case ECT-ECU 400 implements downshift control (from fourth gear to third gear) (downshift request under ECT control), and the shift information transmitted to engine ECU 300 is updated (YES at S302).

When the transmission is effected from fourth gear to third gear, ECT-ECU 400 controls various solenoid valves of oil hydraulic control circuit 700. In accordance with the control of various solenoid valves, transmission control to third gear is effected by the engagement and release of the brake element or clutch element.

At elapse of time T(3) from the change in shift information from fourth gear to third gear (YES at S306), cruise control device 350 determines that down shifting to third gear has been conducted based on the received shift information (S308). Then, an upshift inhibit flag to fourth gear is turned on, and an upshift inhibit request signal is transmitted to ECT-ECU 400 (S310).

Although the requested amount of throttle valve opening is increased in accordance with reduction of the vehicle speed after down shifting from fifth gear to fourth gear has been requested, throttle return control is effected (S314) at elapse of time T(4) from the change in the shift information from fourth gear to third gear (YES at S312), whereby the requested amount of throttle valve opening is reduced. Since increase in the output of engine 200 is suppressed, occurrence of an impact at the vehicle caused by abrupt acceleration at the vehicle when the output of engine 200 is transmitted to the driving wheel subsequent to completion of transmission control towards third gear can be suppressed. The upshift to fourth gear is restricted even if an upshift to fourth gear is requested (broken line) after the upshift inhibit flag towards fourth gear has been turned on.

In accordance with the vehicle apparatus for a vehicle of the present embodiment, in addition to the advantage provided by the control device for a vehicle of the first embodiment, an upshift is reliably restricted every time shift information is updated even in the case where down shifting is conducted continuously during constant speed cruising. Therefore, frequent shifting can be suppressed. Since throttle return control is effected when the output of the engine is transmitted to the driving wheel of the vehicle subsequent to completion of transmission control, the occurrence of an impact caused by a large requested amount of throttle valve opening can be suppressed. Therefore, a control device for a vehicle directed to suppressing frequent shifting and also suppressing an impact occurring at the vehicle subsequent to completion of transmission can be provided. The output state of the engine may be sensed based on the torque required to maintain the set speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for a vehicle mounted with an internal combustion engine and an automatic transmission including a plurality of gears, said automatic transmission provided with a transmission control device determining a gear of said automatic transmission to control said automatic transmission so as to attain the determined gear based on an output state of said internal combustion engine and a running state of said vehicle, said transmission control device providing shift information representing said determined gear to said control device, said control device comprising:

a sensing unit sensing a speed of said vehicle,
a determination unit determining an output of said internal combustion engine such that said sensed speed attains a preset speed,
a control unit controlling an output of said internal combustion engine by controlling an opening of a throttle valve provided at said internal combustion engine based on said determined output,
a shift information sensing unit sensing a change in said shift information when said transmission control device controls said automatic transmission such that the gear of said automatic transmission is down shifted,
a transmission control unit opening said throttle valve to down shift said automatic transmission in a state in which the speed of the vehicle is at the preset speed,
a restriction unit restricting an upshift of said gear based on said changed shift information after a first period of time elapses from sensing said change under said state of the speed of said vehicle being preset,
a reduction unit reducing the opening of said throttle valve of said internal combustion engine after a second period of time elapses from sensing said change, wherein said second period of time is longer than said first period of time, and
wherein said second period of time is a period of time starting from sensing said change until the output of said internal combustion engine is transmitted to a driving wheel of said vehicle.

2. A control device for a vehicle mounted with an internal combustion engine and an automatic transmission including a plurality of gears, said automatic transmission provided with a transmission control device determining a gear of said automatic transmission to control said automatic transmission so as to attain the determined gear based on an output state of said internal combustion engine and a running state of said vehicle, said transmission control device providing shift information representing said determined gear to said control device, said control device comprising:

sensing means for sensing a speed of said vehicle,
determination means for determining an output of said internal combustion engine such that said sensed speed attains a preset speed,
control means for controlling an output of said internal combustion engine by controlling an opening of a throttle valve provided at said internal combustion engine based on said determined output,
shift information sensing means for sensing a change in said shift information when said transmission control device controls said automatic transmission such that the gear of said automatic transmission is down shifted,
restriction means for restricting an upshift of said gear based on said changed shift information at elapse of a first period of time from sensing said change under a state of the speed of said vehicle being preset,
transmission control means for opening said throttle valve to down shift said automatic transmission in the state in which the speed of the vehicle is at the preset speed,
reduction means for reducing the opening of said throttle valve of said internal combustion engine after a second period of time elapses from sensing said change, wherein said second period of time is longer than said first period of time, and
wherein said second period of time is a period of time starting from sensing said change until the output of said internal combustion engine is transmitted to a driving wheel of said vehicle.

3. A control device according to claim 1, wherein said reduction unit reduces the opening of said throttle valve while the restriction unit is continuing to restrict an upshift.

4. A control device according to claim 1, wherein when said reduction unit reduces the opening of the throttle valve the automatic transmission is in the same gear ratio resulting from the gear of said automatic transmission being down shifted.

5. A control device according to claim 1, wherein after said change said automatic transmission is in a down shifted gear ratio, and wherein said reduction unit reduces the opening of said throttle valve of the internal combustion engine while said automatic transmission is in said down shifted gear ratio and while upshifting is being restricted by said restriction unit.

6. A control device according to claim 2, wherein said reduction means reduces the opening of said throttle valve while the restriction means is continuing to restrict an upshift.

7. A control device according to claim 2, wherein when said reduction means reduces the opening of the throttle valve the automatic transmission is in the same gear ratio resulting from the gear of said automatic transmission being down shifted.

8. A control device according to claim 2, wherein after said change said automatic transmission is in a down shifted gear ratio, and wherein said reduction means reduces the opening of said throttle valve of the internal combustion engine while said automatic transmission is in said down shifted gear ration and while upshifting is being restricted by said restriction means.

* * * * *